(12) United States Patent
Liu et al.

(10) Patent No.: US 7,739,219 B2
(45) Date of Patent: Jun. 15, 2010

(54) TECHNIQUES OF OPTIMIZING QUERIES USING NULL EXPRESSION ANALYSIS

(75) Inventors: Zhen Hua Liu, San Mateo, CA (US);
Muralidhar Krishnaprasad, Fremont, CA (US); Hui Joe Chang, Fremont, CA (US); Anand Manikutty, Foster City, CA (US); James W. Warner, Lake Oswego, OR (US); Vikas Arora, San Francisco, CA (US); Susan Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 237 days.

(21) Appl. No.: 11/517,969

(22) Filed: Sep. 8, 2006
(Under 37 CFR 1.47)

(65) Prior Publication Data

US 2008/0065674 A1    Mar. 13, 2008

(51) Int. Cl.
*G06F 17/30* (2006.01)
(52) U.S. Cl. .......................................... 707/2; 707/718
(58) Field of Classification Search ................ 707/2, 707/3, 4, 100, 101
See application file for complete search history.

(56) References Cited

U.S. PATENT DOCUMENTS

| | | | | |
|---|---|---|---|---|
| 4,439,837 A | * | 3/1984 | Aiena et al. | 711/117 |
| 4,536,873 A | * | 8/1985 | Leete | 370/424 |
| 5,088,032 A | * | 2/1992 | Bosack | 709/242 |
| 5,590,324 A | * | 12/1996 | Leung et al. | 707/5 |
| 5,819,256 A | * | 10/1998 | Ozbutun et al. | 707/2 |
| 5,905,982 A | * | 5/1999 | Carey et al. | 707/4 |
| 6,253,195 B1 | | 6/2001 | Hudis et al. | |
| 6,282,537 B1 | | 8/2001 | Madnick et al. | |
| 6,295,541 B1 | | 9/2001 | Bodnar et al. | |
| 6,892,210 B1 | | 5/2005 | Erickson et al. | |
| 7,031,956 B1 | | 4/2006 | Lee et al. | |
| 7,043,716 B2 | | 5/2006 | Zimmer et al. | |
| 7,266,764 B1 | | 9/2007 | Flam | |

(Continued)

OTHER PUBLICATIONS

International Preliminary Examining Authority, "Written Opinion," PCT/US2005/021259, dated Oct. 13, 2006, 7 pages.

(Continued)

*Primary Examiner*—Tony Mahmoudi
*Assistant Examiner*—Md. I Uddin
(74) *Attorney, Agent, or Firm*—Hickman Palermo Truong & Becker LLP (57) ABSTRACT

A method for optimizing queries is described. A query, which includes a first expression for determining whether each of a set of values evaluates to NULL or NOT NULL, is received. At compile-time, a first representation of the query is generated, where the first representation indicates that the query is to be performed based on the first expression. Based on the first expression, a second expression is determined. The second expression is such that the first expression would evaluate to any NOT NULL value if and only if the second expression would evaluate to any NOT NULL value. The second expression, when evaluated, is much more computationally efficient compared with the evaluation of the first expression. Based on the first representation, a second representation of the query is generated, where the second representation indicates that the query is to be performed based on the second expression. Thereafter, the query is executed based on the second representation.

60 Claims, 2 Drawing Sheets

U.S. PATENT DOCUMENTS

| | | | |
|---|---|---|---|
| 2002/0073019 A1 | 6/2002 | Deaton | |
| 2002/0100027 A1 | 7/2002 | Binding et al. | |
| 2002/0116457 A1 | 8/2002 | Eshleman et al. | |
| 2003/0200214 A1 | 10/2003 | Doole et al. | |
| 2004/0015783 A1 | 1/2004 | Lennon et al. | |
| 2004/0143581 A1 | 7/2004 | Bohannon et al. | |
| 2004/0148278 A1 | 7/2004 | Milo et al. | |
| 2004/0167904 A1 | 8/2004 | Wen et al. | |
| 2004/0193575 A1* | 9/2004 | Chen et al. | 707/3 |
| 2004/0260691 A1 | 12/2004 | Desai et al. | |
| 2004/0267760 A1 | 12/2004 | Brundage et al. | |
| 2005/0004892 A1 | 1/2005 | Brundage et al. | |
| 2005/0022115 A1 | 1/2005 | Baumgartner et al. | |
| 2005/0160076 A1 | 7/2005 | Kanemasa | |
| 2005/0289125 A1* | 12/2005 | Liu et al. | 707/3 |
| 2007/0011167 A1 | 1/2007 | Krishnaprasad et al. | |

OTHER PUBLICATIONS

Current Claims, PCT/US2005/021259, 10 pages.

Funderbunk, J. et al., "XML programming with SQL/XML and XQuery", IBM Systems Journal XP-002295973 (2002) pp. 642-665.

Rys, Michael et al., "Integrating XQuery and Relational Database Systems," Chapter 7—*XQuery from the Experts: A Guide to the W3C XML Query Language,* Addison Wesley Professional, Aug. 22, 2003, ISBN 978-0-321-18060-5, pp. 353-391.

Zemke, Fred, "XMLQuery," Change Proposal, ISO/IEC JTC1/SC32 WG3:SIA-nnn ANSI NCITS H2-2004-02Irl, Mar. 14, 2004, 29 pages.

European Patent Office, "Communication Pursuant to Article 94(3) EPC", Application No. 05 760 442.3-2201, dated Jun. 20, 2008, 2 pages.

Claims, Application No. 05 760 442.3-2201, 8 pages.

International Preliminary Examining Authority, "Notification of Transmittal of the International Preliminary Report on Patentability," PCT/US2005/021259, dated Feb. 2, 2007, 9 pages.

Claims, PCT/US2005/021259, dated Nov. 30, 2006, 8 pages (attached).

* cited by examiner

TECHNIQUES OF OPTIMIZING QUERIES USING NULL EXPRESSION ANALYSIS

CROSS-REFERENCE TO RELATED APPLICATIONS

This application is related to U.S. patent application Ser. No. 10/948,523, entitled "EFFICIENT EVALUATION OF QUERIES USING TRANSLATION", filed by Zhen Hua Liu et al. on Sep. 22, 2004, the entire contents of which is hereby incorporated by reference for all purposes as if fully set forth herein.

FIELD OF THE INVENTION

The present invention generally relates to data processing. The invention relates more specifically to techniques for optimizing queries by using NULL expression analysis.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A data item is said to be "NULL", or to have a NULL value, if the actual value of the data item is unknown or not meaningful; otherwise, the data item is said to be "NOT NULL", or to have a NOT NULL value that may be of any datatype that can be associated with the data item. (Thus, a NULL value is not the same as an arithmetic zero or a Boolean FALSE value.) As referred to herein, a data item may be any identifiable portion of data including, but not limited to, a value stored in a particular column of a particular row of a relational table in a relational database, an object stored in a table of an object database, and an instance of Extensible Markup Language (XML) data stored in an XML document.

As used herein, "count( ) query" refers to a query that includes a count( ) operator. Generally, an operator is a set of instructions which, when executed, perform one or more specific operations. An operator may take zero or more input arguments and may be implemented in various ways, such as, for example, as a function, as a subroutine, or as a construct. A count( ) operator, also referred to hereafter as "count operator", is an operator which, when evaluated against a set of data items, returns the cardinality of the set. (The cardinality of a set of data items is typically the number of items in the set.)

Queries that include count operators are widely used and may be, for example, Structured Query Language (SQL) queries, XML Query Language (XQuery) queries, or the SQL/XML queries. A SQL query is a query that conforms to a particular SQL specification. An XQuery query is a query that conforms to an XQuery specification. A draft specification for XQuery is described in "XQuery 1.0: An XML Query Language", W3C Candidate Recommendation 3 Nov. 2005, the entire content of which is hereby incorporated by reference for all purposes as if fully set forth herein. A SQL/XML query is a query that includes one or more operators defined according to a SQL/XML standard, such as, for example, the SQL/XML standard defined in INCITS/ISO/IEC 9075-14: 2003, the entire content of which is hereby incorporated by reference for all purposes as if fully set forth herein.

Both SQL and the SQL/XML standard provide a count operator that is implemented as a built-in aggregate function which, when evaluated against a set of values, returns the number of NOT NULL values in the set. For example, a SQL count aggregate operator, which is specified in a SQL query that is evaluated against a relational table, would return a number indicating the number of rows from the table that satisfy the condition that the computed input expression to the operator is NOT NULL. The SQL count operator may be evaluated against all rows of the relational table or against a subset of all the rows, where the subset may be determined based on other clauses (e.g. WHERE clause) of the query and any predicates specified therein. In another example, an XQuery count operator, which is specified in an XQuery query that is evaluated against an XQuery data model instance (e.g., a sequence), would return a number of items in the sequence that satisfy the criteria specified in the input expression of the count( ) XQuery query.

Consider, for example, the following SQL/XML query Q0:

Q0. select count(XMLForest(ename) NULL ON NULL)
    from emp

The XMLForest( ) operator is a SQL/XML function that takes as an input argument the scalar value stored in a particular column of a table and returns an XML instance containing an XML element, where the content of the XML element is a NOT NULL value from the scalar value stored in the particular column and the name of the XML element is the name of the particular column. In query Q0, the "NULL ON NULL" option specified in the XMLForest( ) operator indicates that when the input scalar value argument is a NULL value, the output XML instance is also a NULL value. Thus, when the count( ) aggregate operator is executed against table "emp", query Q0 would count all the "ename" XML elements that are constructed from the values stored in the "ename" column of each row of table "emp". If in a particular row the value stored in column "ename" is a NULL value, then according to the semantics of the XMLForest( ) operator with the "NULL ON NULL" option, no "ename" XML element is constructed for that row and consequently the count operator would not count such a row.

Developers that implement count( ) queries in software applications, as well as the users of such applications, typically expect the count( ) queries to execute very fast since the count queries would do nothing more than accumulate a count and return a number. However, the past approaches for evaluating count( ) queries cannot guarantee that the count( ) queries would be evaluated in an optimal way, and consequently cannot guarantee an acceptably fast execution time for the queries. This disadvantage of the past approaches is particularly severe and noticeable for count( ) queries that are executed against large XML documents to count instances of XML data stored therein or against large object database tables to count objects stored therein.

For example, according to one such approach for evaluating a count( ) query against a set of XML documents, a resulting set of instances of XML data is first materialized. (The materialized instances of XML data may be of any XML datatype, such as, for example, the XMLType datatype defined in the SQL/XML standard, or may be constructed from the object relational storage of XMLType). Then, this approach provides for testing the resulting set of instances of XML data to determine whether the instances are NULL values or not. Finally, the instances of XML data that are NOT NULL values are excluded and the resulting set with the remaining NOT NULL instances of XML data is added for accumulating the count result. The disadvantage of this approach is that the resulting set passed into the count operator has to be materialized and constructed before the determination can be made of whether the XML data instances in the set store NULL values or NOT NULL values. However, materializing and constructing a set of instances of XML data is very expensive with respect to the computational resources used (such as, for example, memory, CPU time, and disk space), especially when the set of instances that needs to be materialized is large. Exacerbating the problem even further, in this approach computational resources must be expended for materializing and constructing all the instances of XML data in the resulting set regardless of whether the materialized or constructed XML data instances are NULL or not, even though whether the base input column values to materialize or construct the XML data instance are NULL or not can be determined during query compile time.

Although the disadvantages related to processing NULL data items are presented above with respect to count( ) queries, it is noted that these disadvantages are not unique to count( ) queries or count operators. Rather, these disadvantages are common to any queries that require performing operations on NULL data items, where the operations may be specified in any expressions, select list items, and/or functional constraints of the queries.

Based on the foregoing, there is a clear need for techniques for optimizing queries that that overcome the disadvantages described above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW OF ONE EMBODIMENT

In one embodiment, the techniques described herein provide for optimizing a count( ) query during compilation time. The expression that is passed as an input argument into the count operator of the query is analyzed and is replaced by another expression which would be more efficiently evaluated during run-time with respect to computational resources such as, for example, CPU time, memory, and storage space.

During the compilation time of a count( ) query, the input expression passed as an input argument to the count operator is analyzed to determine the minimal expression which is NULLness equivalent to the input expression. As the term is used herein, the "NULLness" of an expression is a Boolean value (TRUE or FALSE) that indicates whether the expression, when evaluated, would return a NULL or NOT NULL value. For example, the NULLness of a particular expression is TRUE if the expression, when evaluated, returns a NULL value; similarly, the NULLness of the particular expression is FALSE if the expression, when evaluated, returns a NOT NULL value. A first expression is referred to herein as being NULLness equivalent to a second expression when the first expression would evaluate to a NOT NULL value if and only if the second expression would evaluate to a NOT NULL value.

As used herein, the term "minimal expression" refers to an expression which, when evaluated, would return the same count result as the original input expression except that computing the minimal expression is much less computationally intensive compared with computing the original input expression. Further, in some embodiments, the minimal expression can be moved into one or more query predicates so that a smaller set of values can be passed to the count operator to correctly compute the requested result.

By determining the minimal expression for the input expression of a count operator during compilation time, the techniques described herein provide for computing the NULLness of a set of values that is smaller and/or more efficiently obtained than the original set of values that would be otherwise processed. Thus, the techniques described herein avoid costs associated with materializing any necessary intermediate results, such as, for example, any instances of XML data for which the NULLness may need to be determined before the count operator is evaluated. In this way, according to the techniques described herein a count( ) query is optimized during compilation time in order to perform as little data materializations and/or computations at run-time as possible.

In one embodiment, the techniques described herein provide for using a set of NULL analysis rules during query compilation time in order to determine the minimal expression for the original input expression of the count operator. After the minimal expression is determined, the count( ) query that includes the count operator is rewritten to indicate that the count operator is to be performed based on the minimal expression when the query is executed.

For example, consider again query Q0:

Q0. select count(XMLForest(ename) NULL ON NULL)
     from emp

When the techniques described herein are applied to query Q0, query Q0 is rewritten and a representation of the equivalent query Q1, which is provided below, is generated:

Q1. select count(ename)
     from emp

The semantics of the XMLForest( ) function with "NULL ON NULL" option dictate that the function would construct XML elements only from NOT NULL values that are passed as input arguments. Thus, according to one NULLness analysis rule set forth herein, the "ename" expression is NULLness equivalent to the "XMLForest(ename) NULL ON NULL" expression because the "XMLForest(ename) NULL ON NULL" expression evaluates to a NOT NULL value if and only if the "ename" expression evaluates to a NOT NULL value. For this reason, the "ename" expression is the minimal expression for the "XMLForest(ename) NULL ON NULL" expression that is passed as an input argument to the count operator in query Q0. Consequently, query Q0 can be optimized by replacing the "XMLForest(ename) NULL ON NULL" expression with the "ename" expression in query Q1. In this example, by replacing the XMLForest( ) function with "NULL ON NULL" option, the techniques described herein eliminate the materialization of XML elements that would otherwise be necessary and provide for performing the count operator more efficiently over a simple relational scalar column.

In different embodiments, the techniques described herein may be implemented by software and/or hardware components in a variety of computer systems and in a variety of operational contexts. For example, the techniques described herein may be implemented in any server that is capable of processing SQL, XQuery, and/or SQL/XML queries, such as, for example, an application server and a database server. In general, a server is a combination of integrated software components and an allocation of computational resources, such as memory, CPU time, and/or disk storage space. An application server is a server that is configured for supporting one or more applications that perform particular application-specific tasks. A database server is a server that performs one or more data management tasks for data that is stored in various repositories which may include, but are not limited to, relational databases, object databases, object-relational databases, various kinds of XML data repositories, and any combinations thereof. By utilizing its allocated resources, a database server may perform a variety of data management tasks, such as, for example, governing and facilitating access to particular databases, and processing requests by clients to access the databases.

In one embodiment, the techniques described herein for optimizing count( ) queries may be performed by one or more software components of a query compiler and/or a query processor that are executing in a database server. In another embodiment, the techniques described herein may be performed by one or more software components of an application server that is configured for performing any application-specific tasks. Further, the software and/or hardware components performing the techniques described herein may be implemented in their respective computer systems in a variety of ways including, but not limited to, as standalone applications, as libraries of functions, as dynamically linked libraries, and as user or system processes or threads. Thus, the techniques described herein are not limited to being implemented on any particular type of server and/or computer system, and for this reason the embodiments of the techniques described herein are to be regarded in an illustrative rather than a restrictive sense.

FUNCTIONAL OVERVIEW OF ONE EMBODIMENT

Figure 1:
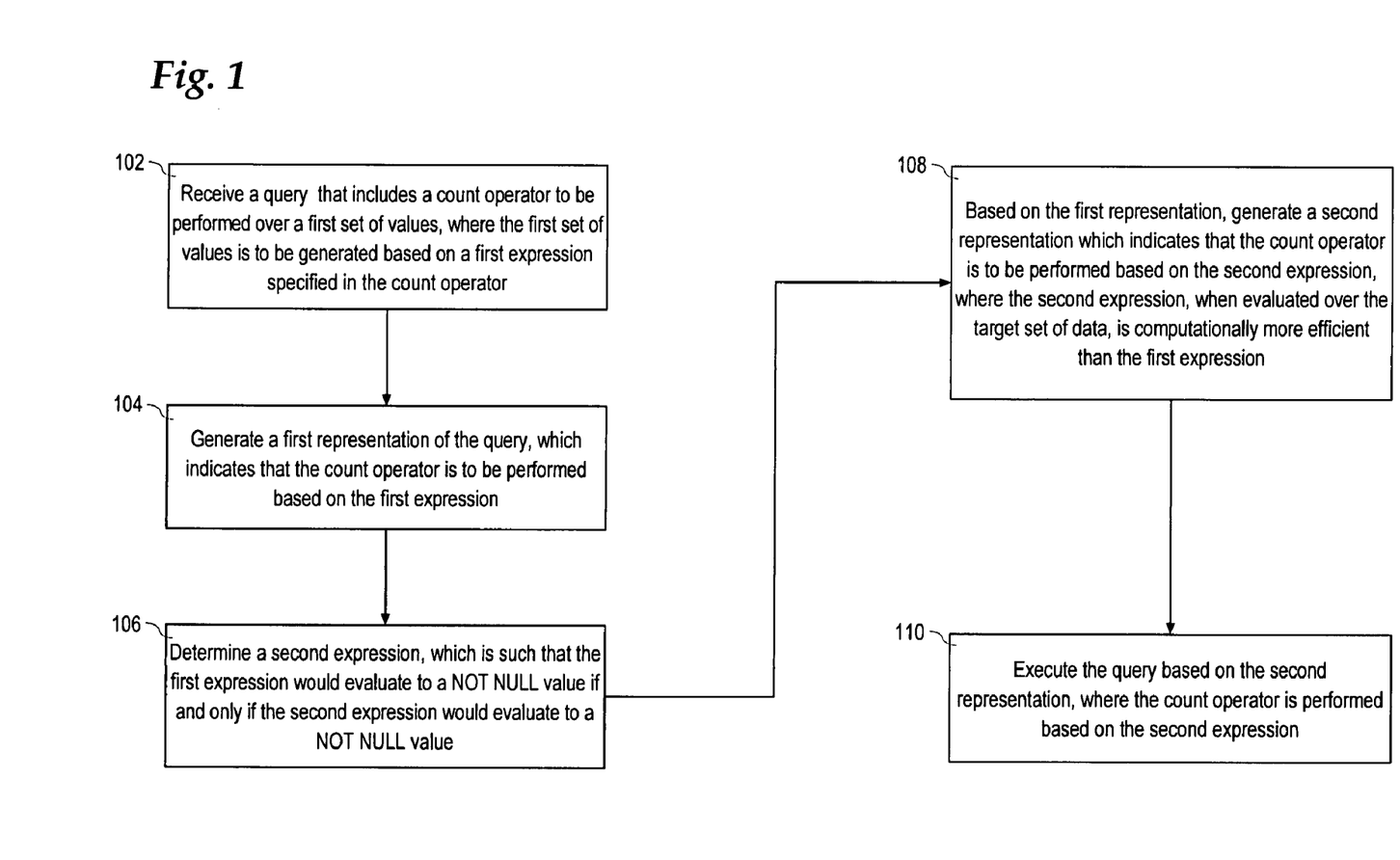
FIG. 1 is a flow diagram that illustrates an overview of a method for optimizing count( ) queries according to one embodiment.

FIG. 1 is a flow diagram that illustrates an overview of a method for optimizing count( ) queries according to one embodiment.

In step 102, a count( ) query that includes a count operator is received. The query is to be executed against a target set of data, where the target set of data may be any set of data including, but not limited to, a set of rows from one or more relational tables, a set of objects from one or more object tables in an object database, and a set of instances of XML data. The count operator includes as an input parameter an expression which, when evaluated during the execution of the query, would generate a first set of values over which the count operator is to be evaluated. In this embodiment, the received count( ) query may any one of a SQL query, XQuery query, and a SQL/XML query.

In step 104, a first representation of the received count( ) query is generated. The first representation indicates that the count operator is to be performed based on the first expression. In some embodiments, the first representation of the count( ) query may be an expression tree representing a parsed version of the query and may be generated by a parser. In these embodiments the expression tree may include an operator tree, which represents the count operator and indicates that the count operator is to be performed based on the first expression. For example, the expression tree may be an Abstract Syntax Tree (AST) that represents the various operators and operands in the query. (In general, an AST is a representation of a set of executable statements. An AST representation is typically a tree structure in which internal tree nodes are associated with the operations specified in the set of statements being represented by the AST, and the leaf tree nodes are associated with the operands for the operations specified in the internal tree nodes to which the leaf tree nodes are related.)

In other embodiments, the first representation may be a tree representing a type-checked and/or compiled version of the received query and may be generated by a compiler. In yet other embodiments, the first representation of the received query may be any data structure, such as, for example, a table, on the bases of which the query may subsequently be executed. In addition, in various embodiments the first representation may be generated in volatile memory (e.g. RAM) and/or in persistent storage (e.g. hard disk) of a computer system. Thus, the techniques described herein are not restricted to any particular type of representation that is generated for the received query.

Prior to executing the received count( ) query (for example, during parse time or compilation time), in step 106 a second expression is determined based at least on the first expression that is specified as an input parameter to the count operator. The second expression may be NULLness equivalent to the input expression, that is, the second expression may be such that the first expression would evaluate to a NOT NULL value if and only if the second expression would evaluate to a NOT NULL value. In some particular implementations, the second expression may be the minimal expression for the input expression, which minimal expression when evaluated would be less resource intensive to compute compared with the original input expression. The count operator, when performed based on the minimal expression, would still evaluate to the same result as when performed based on the original input expression. In one embodiment, the second expression may be determined by executing a function to analyze the first expression with respect to a set of NULLness analysis rules.

In step 108, a second representation of the received count( ) query is generated based on the first representation. For example, the expression tree of the query may be rewritten into a modified expression tree. The modified expression tree may include a count operator tree which indicates that the count operator is to be performed based on the second expression that was determined in step 106. The second representation corresponds to an equivalent query of the received count( ) query. (As referred to herein, a first query is equivalent to a second query if the first query, when executed, would return the same results as the second query.) In some embodiments, according to the techniques described herein the first representation is rewritten into a second representation after the received count( ) query is parsed but before the received query is compiled. In other embodiments, the first representation of the received count( ) query is rewritten into the second representation during the compilation of the received query but before the query is executed. In yet other embodiments in which parsing, type-checking, compiling, and/or executing the count( ) query is performed dynamically in a set of integrated steps by an integrated software component, the first representation may be rewritten into the second representation at any point before the received count( ) query is executed.

After the first representation of the received count( ) query is rewritten according to the techniques described herein into the second representation which indicates that the count operator is to be performed based on the second expression, in step 110 the query is executed based on the second representation.

In different embodiments, the received count( ) query may be executed based on the second representation in a variety of ways. For example, an execution tree or an execution plan of the received query may be generated based on the second representation. The execution tree or the execution plan of the received query may then be stored for future use or may be executed immediately by the computer system that is processing the query. In another example, the techniques described herein may be performed by an application server or a client that is not capable of executing the received count( ) query against a database or a repository of XML data. In this example, the application server or client may use the second representation to generate an optimized equivalent query of the received query. Thereafter, the application server or client may send the generated equivalent query to a database server for execution. Thus, the techniques described herein are not limited to any particular manner in which the received query may be executed based on the generated second representation.

NULLness Equivalency Analysis of Query Expressions

In one embodiment, the techniques described herein provide for determining minimal expressions for count operator input expressions by analyzing the input expressions. In this embodiment, a special function is used to analyze count operator input expressions against one or more NULLness analysis rules.

For example, in this embodiment the following analysis function may be used to analyze count operator input expressions:

status analyzeExpressionIsNotNULL(inputExpr, outputExpr)

where "status" is a return value indicating the result of the analysis, "inputExpr" is the input expression being analyzed (typically the "inputExpr" would be the expression passed as an input argument to the count operator, except in the cases of recursive calls to the function), and "outputExpr" is an intermediary expression which may be used as the input argument in a recursive call to the function in order to further analyze the original input expression.

The analyzeExpressionIsNotNULL( ) function may return the following four types of status values:

ISNOTNULL_ALWAYS_TRUE—this status value indicates that the "inputExpr" input expression, when evaluated over the target set of data specified in the underlying count( ) query, would generate only NOT NULL values;

ISNOTNULL_ALWAYS_FALSE—this status value indicates that the "inputExpr" input expression, when evaluated over the target set of data specified in the underlying count( ) query, would generate only NULL values;

ISNOTNULL_DEPENDS—this status value indicates that the "inputExpr" input expression, when evaluated over the target set of data specified in the underlying count( ) query, may generate both NULL and NOT NULL values depending on a second expression, which is returned as the "outputExpr" expression from the function; and ISNOTNULL_UNKNOWN—this status value indicates that the "inputExpr" input expression is too opaque and/or complex for performing NULLness analysis.

When called, the analyzeExpressionIsNotNULL( ) function returns status ISNOTNULL_ALWAYS_TRUE if it determines that the "inputExpr" expression would always evaluate to a NOT NULL value. Similarly, the analyzeExpressionIsNotNULL( ) function returns status ISNOTNULL_ALWAYS_FALSE if it determines that the "inputExpr" expression would always evaluate to a NULL value. The analyzeExpressionIsNotNULL( ) function returns status ISNOTNULL_UNKNOWN if it determines that the "inputExpr" expression is too opaque and/or complex to be analyzed. If the "inputExpr" depends on some of its component sub-expressions and can be analyzed based on one or more of these sub-expressions, then the analyzeExpressionIsNotNULL( ) function, when called, returns status ISNOTNULL_DEPENDS and sets the one or more sub-expressions as the "outputExpr" expression; thereafter, the function is called recursively for all of the one or more sub-expressions where each of the returned "outputExpr" expressions is set as the "inputExpr" in the corresponding recursive call.

In this embodiment, after the analyzeExpressionIsNotNULL( ) function is called to analyze the expression that is passed as an input argument to the count operator, the returned status is checked. The second expression, which is NULLness equivalent to the count operator input expression and would facilitate a more efficient evaluation of the count operator, is then determined based on the value of the returned status.

For example, if the status returned from the analyzeExpressionIsNotNULL( ) function is ISNOTNULL_ALWAYS_TRUE, then the second expression is determined as a constant NOT NULL value. For example, if in the original count( ) query the count operator is specified as "count(inputExpr)", then after the analyzeExpressionIsNotNULL( ) function returns ISNOTNULL_ALWAYS_TRUE the count operator is rewritten into "count(1)".

If the status returned from the analyzeExpressionIsNotNULL( ) function is ISNOTNULL_ALWAYS_FALSE, then the second expression is determined as a constant NULL value. For example, if in the original count( ) query the count operator is specified as "count(inputExpr)", then after the analyzeExpressionIsNotNULL( ) function returns ISNOTNULL_ALWAYS_FALSE the count operator is rewritten into "count(NULL)".

If the status returned from the analyzeExpressionIsNotNULL( ) function is ISNOTNULL_DEPENDS and the function also returns an "outputExpr" expression, then the second expression is determined as the "outputExpr" expression. For example, if in the original count( ) query the count operator is specified as "count(inputExpr)", then after the analyzeExpressionIsNotNULL( ) function returns ISNOTNULL_DEPENDS the count operator is rewritten into "count(outputExpr)".

Finally, if the status returned from the analyzeExpressionIsNotNULL( ) function is ISNOTNULL_UNKNOWN, then the second expression is set to be the same as the first expression. In other words, in this case the count operator is left as it was specified in the original count( ) query.

The following Table 1 provides a summary of the NULLness analysis rules that may be used by the analyzeExpressionIsNotNULL( ) function to determine the status returned for some specific input expressions:

TABLE 1

NULLness Analysis Rules For Some Expressions

| Input Expression | Analysis Rule |
| --- | --- |
| NULL constant | Return ISNOTNULL_ALWAYS_FALSE |
| NOT NULL constant | Return ISNOTNULL_ALWAYS_TRUE |
| Not nullable table column | Return ISNOTNULL_ALWAYS_TRUE |
| Nullable table column | Return ISNOTNULL_DEPENDS with "outputExpr" set to be the nullable table column |
| XMLElement(. . .) EMPTY ON NULL | Return ISNOTNULL_ALWAYS_TRUE |
| XMLForest(e1) NULL ON NULL | Return ISNOTNULL_DEPENDS with "outputExpr" set to be the "e1" table column |
| XMLConcat(e1, e2, . . . , eN) | Recursively call analyzeExpressionIsNotNULL( ) on each of the input arguments "e1", "e2", . . . , "eN". If at least one call returns ISNOTNULL_ALWAYS_TRUE, then return ISNOTNULL_ALWAYS_TRUE. If all calls return ISNOTNULL_ALWAYS_FALSE, then return ISNOTNULL_ALWAYS_FALSE. If at least one call returns ISNOTNULL_UNKNOWN, then return ISNOTNULL_UNKNOWN. Otherwise, return ISNOTNULL_DEPENDS and set the "outputExpr" to be a logical OR operation of all "outputExpr" expressions returned from each recursive call. |
| User-defined function foo(e1) | Return ISNOTNULL_DEPENDS and set "outputExpr" to "e1" if foo( ) is a function declared as satisfying the property that foo( ) is NOT NULL if and only if "e1" is NOT NULL |

Some of the NULLness analysis rules in Table 1 refer to nullable and not nullable columns. When a column in a table is declared as not nullable, in each of row in the table the column must store a NOT NULL value. When a column in a table is declared as nullable, then in each row in the table the column may store either a NULL or a NOT NULL value.

SQL/XML Operators as Count Operator Expressions

Some of the NULLness analysis rules in Table 1 refer to the SQL/XML operators XMLForest( ), XMLElement( ), and XMLConcat( ). The XMLForest( ) operator was described heretofore.

The XMLElement( ) operator is a SQL/XML function that takes as an input argument a scalar value (which may be stored in a particular column of a table), and returns a an XML element whose content is the scalar value. (An XML element is a portion of an XML document that is defined by a pair of an opening and closing tags; the data included between the opening and closing tags is the XML element's content.) According to the semantics of the XMLElement( ) operator with "EMPTY ON NULL" option, the XML element always returns a NOT NULL value which is an XML element. (In some embodiments, the "EMPTY ON NULL" option is an implicit default option if the XMLElement( ) operator is specified without any options.) The "EMPTY ON NULL" option indicates that if the input argument to the XMLElement( ) operator is a NULL value, then the XMLElement( ) operator would still return an XML element, except that the content of the XML element would be empty or blank (i.e. the returned XML element would include only the opening and closing tags and no data in between the tags). Thus, the semantics of the XMLElement( ) operator with "EMPTY ON NULL" option guarantees that the result returned by the operator would always be a NOT NULL value. For this reason, the NULLness analysis rule in Table 1 provides that the analyzeExpressionIsNotNULL( ) function, when analyzing an XMLElement( ) operator with "EMPTY ON NULL" option, returns status ISNOTNULL_ALWAYS_TRUE, and consequently the NULLness equivalent expression of an XMLElement( ) operator with "EMPTY ON NULL" option is set to a constant NOT NULL value. In other words, a "count(XMLElement( . . . ) EMPTY ON NULL)" operator may be rewritten according to the techniques described herein as "count(1)".

The XMLConcat( ) operator is a SQL/XML aggregate function which, when evaluated, returns the concatenation of the XML fragments that are passed as input arguments to the operator. (An XML fragment is a set of nodes in an XML document that descend from a parent node, which set of nodes represent XML elements or sequences of XML elements in the document.)

The NULLness analysis rule in Table 1 provides that, when analyzing an XMLConcat( ) operator as an input expression, the analyzeExpressionIsNotNULL( ) function would be called recursively for each of the input arguments to the XMLConcat( ) operator. If at least one recursive call returns ISNOTNULL_ALWAYS_TRUE, then the outer-most recursive call to the analyzeExpressionIsNotNULL( ) function returns ISNOTNULL_ALWAYS_TRUE, and consequently the NULLness equivalent expression for the XMLConcat( ) operator may be set to a constant NOT NULL value (e.g. the "count(XMLConcat(e1, e2, . . . , eN))" operator may be rewritten as "count(1)"). If all recursive calls return ISNOTNULL_ALWAYS_FALSE, then the outer-most recursive call to the analyzeExpressionIsNotNuLL( ) function returns ISNOTNULL_ALWAYS_FALSE, and consequently the NULLness equivalent expression for the XMLConcat( ) operator may be set to a constant NULL value (e.g. the "count (XMLConcat(e1, e2, . . . , eN))" operator may be rewritten as "count(NULL)"). If at least one recursive call returns ISNOTNULL_UNKNOWN, then the outer-most recursive call to the analyzeExpressionIsNotNULL( ) function returns ISNOTNULL_UNKNOWN and the count operator in the underlying count( ) query is left unmodified. Otherwise, the outer-most recursive call to the analyzeExpressionIsNotNULL( ) function returns ISNOTNULL_DEPENDS, and the NULLness equivalent expression for the XMLConcat( ) operator may be established as an expression that is a logical OR operation of all "outputExpr" expressions returned from each recursive call (e.g. the "count(XMLConcat(e1, e2, . . . , eN))" operator may be rewritten as "count(e1 OR e2 OR . . . OR eN)").

User-Defined Functions as Count Operator Expressions

A NULLness analysis rule in Table 1 refers to user-defined function foo( ), which is used herein to identify any user-defined function that is declared with the specified NULLness property. As referred to herein, a user-defined function is a non-native function that is declared by a user to perform one or more specific operations and/or tasks. The techniques described herein may be applied to any user-defined function that is declared in a computer system implementing the techniques as having the property of being NULLness equivalent to one or more of its input argument.

For example, suppose that function foo( ) is declared by a user with a modifier (e.g. an optimizer hint or flag), which indicates that function foo( ) has a NULLness equivalency property. In one embodiment, a function declaration modifier may indicate a NULLness equivalency property which specifies that function foo( ) is NOT NULL if and only if its input argument is NOT NULL. Thus, a "count(foo(e1))" operator may be rewritten and optimized according to the techniques described herein as "count(e1)", instead of having to evaluate function foo( ) over each value of "e1" that may be specified by underlying count( ) query. In this way, the techniques described herein provide that any complex user-defined functions (which would otherwise may be computationally very expensive to evaluate) may be efficiently processed and counted when passed as input arguments to count operators included in count( ) queries.

In different embodiments, various types of NULLness equivalency properties for user-defined functions may be provided to the users to select from. For example, one type of NULLness equivalency property may allow a user to specify that a user-defined function is NULLness equivalent to a particular input argument in the list of input arguments of the function (e.g. the user may specify that the NULLness of the function foo(e1, e2) is equivalent to the NULLness of the input argument "e2"). Another type of NULLness equivalency property may allow a user to specify that a user-defined function is NULLness equivalent to all arguments that are specified in the list of input arguments of the function (e.g. the user may specify that the NULLness of the function foo(e1, e2) is equivalent to the NULLness of both input arguments "e1" and "e2"). Thus, the NULLness equivalency properties for user-defined function that are provided to the users are not limited to any particular type, and for this reason the examples provided herein are to be regarded in an illustrative rather than a restrictive sense.

NULLness Equivalency Analysis for Additional Embodiments

The techniques for NULLness equivalency analysis of query expressions described herein are not limited to being implemented for a particular type of expression in the context of a particular portion or clause of a particular type of query. The heretofore description of the NULLness analysis techniques in the context of expressions included in count operators of count( ) queries is to be regarded in an illustrative rather than a restrictive sense.

In one embodiment, the NULLness equivalency analysis techniques may be used for any query that includes an expression for determining whether each of a set of values evaluates to a NULL value or a NOT NULL value. One example of such expression is an expression that includes an IS NULL operator. Another example is an expression that includes an IS NOT NULL operator.

In this embodiment, according to the techniques described herein a first representation of the query is generated. The first representation indicates that the query is to be executed based on the original expression, which may include an IS NULL operator and/or an IS NOT NULL operator.

Prior to executing the query (for example, during parse time or compilation time) a NULLness equivalency analysis on the original expression is performed to determine a minimal expression that is NULLness equivalent to the original expression. The analysis may be performed by the analyzeExpressionIsNotNULL( ) function based on the NULLness analysis rules described heretofore. The determined minimal expression is such that the original expression would evaluate to any NOT NULL value if and only of the minimal expression would evaluate to any NOT NULL value. Further, the minimal expression, when evaluated, would return the same results as the original expression except that computing the minimal expression is much less computationally intensive compared with computing the original expression.

After the minimal expression is determined, a second representation of the query is generated based on the first representation. The second representation indicates that the received query is going to be performed based on the minimal expression. Thereafter, the query is executed based on the second representation. In this way, according to the techniques described herein, the received query is optimized during parse time or compilation time in order to perform as little data materializations and/or computations at run-time as possible.

For example, consider query Q2:

```
Q2.  select *
     from t
     where f(x) IS NOT NULL
``` which attempts to retrieve a set of rows from table "t", where the retrieved set of rows is to be filtered from all the rows in table "t" by determining, for each row, whether the function "f(x)" evaluates to a NULL value or a NOT NULL value.

Applying the NULLness equivalency analysis techniques described herein may determine that the expression "x IS NOT NULL" is a minimal expression that is NULLness equivalent to the original expression "f(x) IS NOT NULL" in query Q2. Thus, query Q2 may be rewritten and a representation of the equivalent query Q3, which is provided below, may be generated:

```
Q3.  select *
     from t
     where x IS NOT NULL
```

In query Q3, the original expression "f(x) IS NOT NULL" is replaced with its minimal expression "x IS NOT NULL." In this way, when query Q3 is executed instead of query Q2, no computational resources would be expended to compute function "f(x)" for each row in table "t", and the set of rows returned by query Q3 (which is equivalent to the set that would have been returned by query Q2) is determined based on evaluating the simpler minimal expression "x IS NOT NULL".

In different embodiments, the query expression for which NULLness equivalency analysis is performed may be included in various portions of the query. For example, the expression being analyzed may be included in a predicate that is included in any clause of the query, such as, for example, a FOR clause, a WHERE clause, an ORDER BY clause, or a GROUP BY clause. In another example, the expression being analyzed may be an item that is included in the SELECT clause of the query, or may be a functional constraint that is included in any clause of the query. (As referred to herein, a "functional constraint" expression is any expression that specifies the performance of one or more system-provided and/or user-defined functions.)

In addition, in various embodiments the query including the expression being NULLness-analyzed may be a SQL query, a SQL/XML query, or an XQuery query. For example, in one embodiment the NULLness equivalency analysis techniques described herein may be applied to an XQuery query that includes a count operator. In this embodiment, the XQuery count operator may be applied to an instance of XQuery model data in order to count non-empty sequences of data items in the instance. The XQuery query may first be rewritten into a representation that corresponds to an equivalent SQL/XML query, where the rewriting may include translating an empty sequence check into an expression that includes a SQL IS NULL operator. Thereafter, the expression including the IS NULL operator may be NULLness-analyzed according to the techniques herein, and the SQL/XML representation may be rewritten into a representation that includes a corresponding minimal expression for the expression with the IS NULL operator.

In some embodiments, the NULLness equivalency analysis techniques described herein may be applied to a plurality of expressions that may be included in the same or different portions of the same query. Further, the plurality of expressions being NULLness-analyzed may include multiple operators, such as, for example, multiple IS NULL and/or IS NOT NULL operators. Thus, the examples of applying the NULLness equivalency analysis techniques described herein are to be regarded in an illustrative rather than a restrictive sense.

ADDITIONAL FEATURES AND EMBODIMENTS

In one embodiment, the techniques described herein may provide for rewriting a count( ) query into an equivalent query that references, and/or is based on, the storage structures into which the target set of data is stored. In this embodiment, the target set of data may be a set of instances of XML data (e.g. XML elements) in one or more XML documents that are stored in any one of an object-relational storage and a Large Object (LOB) storage, and an XPath expression indicating the location of the set of instances of XML data in the one or more documents may be passed as an input argument to the count operator in the count( ) query. (The XML Path Language, or XPath, is an expression language one specification for which is described in "XML Path Language (XPath) 2.0", W3C Candidate Recommendation 3 Nov. 2005, located at "http://www.w3.org/TR/xpath20/", the entire content of which is hereby incorporated by reference for all purposes as if fully set forth herein.)

In this embodiment, after the count( ) query is received, a first representation of the query may be generated. Thereafter, before executing the query (e.g. during parse time or compilation time), the first representation may be rewritten into a second representation that corresponds to an equivalent query of the received query based on the XPath expression specified in the count operator. The second representation indicates that the count operator is to be performed based on a set of rows stored in one or more relational tables, where the second representation includes at least one operator which, when evaluated, identifies the set of rows in the one or more relational tables. The received query is then executed based on the second representation.

For example, consider query Q4:

Q4. select count(extract(value(p), '/a/b'))
     from potab p which attempts to count the number of XML elements located at path "/a/b/" in target XML documents that are stored in table "potab". If the target XML documents are stored as object-relational storage, then XPath expression "/a/b" maps to column "b" in relational table "potab". Thus, counting over the XML elements identified by the "/a/b" XPath expression in the original target XML documents is equivalent to counting all the NOT NULL values in column "b". (When object-relational storage is used to physically store XML data, an instance of XML data is shredded into its XML elements and attributes. The XML elements' contents and the attribute values are stored in columns of one or more relational tables, where the columns are associated with relational database datatypes. The one or more relational tables may be related by a set of primary and foreign keys, where the values of the primary and foreign keys may be stored in primary and foreign key columns in the tables.)

Thus, when the techniques described herein are applied to query Q4, query Q4 is rewritten and a representation of the equivalent query Q5, which is provided below, is generated:

Q5. select count(1)
     from potab
     where potab.b IS NOT NULL

In query Q5, the "IS NOT NULL" unary operator is included in the "potab.b IS NOT NULL" predicate to filter out the rows in the "potab" table in order to select only the rows in which column "b" stores a NOT NULL value.

Suppose now that the above query Q4 is executed against target XML documents that are stored in any one of a LOB storage or an object-oriented storage, and that there is an XPath index created over the XML elements identified by the "/a/b" XPath expression. Thus, counting over the XML elements identified by the "/a/b" XPath expression in the original target XML documents is equivalent to counting the existing nodes in the XML documents that are identified by the XPath expression. (When LOB storage is used to physically store XML data, an instance of XML data is stored in a record of a relational table where the instance is stored in a column of the table that is associated with an LOB datatype. For example, an instance of XML data that is an XML document may be stored in a LOB column of a table record. The data stored in the LOB column may be of any LOB type, such as, for example, a Character LOB (CLOB) or a Binary LOB (BLOB). The LOB column of the table record may store the entire XML document, and the table may include multiple records for storing a collection of XML documents where each record stores a separate XML document in its LOB column. An XML path index provided for instances of XML data is stored as records in a relational table, where each record stores an indexed path to an XML fragment of an instance of the XML data.)

Thus, when the techniques described herein are applied to query Q4, query Q4 is rewritten and a representation of the equivalent query Q6, which is provided below, is generated:

```
Q6.  select count(*)
       from potab p
       where existsNode(value(p),'/a/b'))=1
```

In query Q6, the existsNode( ) operator is included to filter out the rows in the "potab" table in order to select only the rows which store nodes corresponding to XML elements identified by the "/a/b" XPath expression.

Thereafter, query Q6 may be further rewritten and a representation of the equivalent query Q6, which is provided below, may be generated:

```
Q7.  select count(*)
       from potab p
       where exists(select 1
             from path_index_table q
             where path_index_column='/a/b'
             and q.rowid = p.rowid
       )
```

Query Q7 takes advantage of the XPath index created over the target XML documents. The XPath index is stored in relational table "path_index_table". In this table, XPath location paths to XML elements in the target XML documents are stored in the key column "path_index_column". Thus, the existsNode( ) operator in query Q6 is rewritten into the predicate "path_index_column='/a/b'", which is used to filter out the rows in the "path_index_table" table in order to select only the rows which store indexed location paths to nodes corresponding to XML elements identified by the "/a/b" XPath expression. In this way, the counting of XML elements located in the target XML documents at XPath location path "/a/b" as specified in the original count( ) query Q4 may be simplified and optimized, as specified in queries Q6 and Q7, into counting the number of rows in a set of rows that is filtered from a relational table, e.g. "potab" and "path_index_table", respectively.

Hardware Overview

Figure 2:
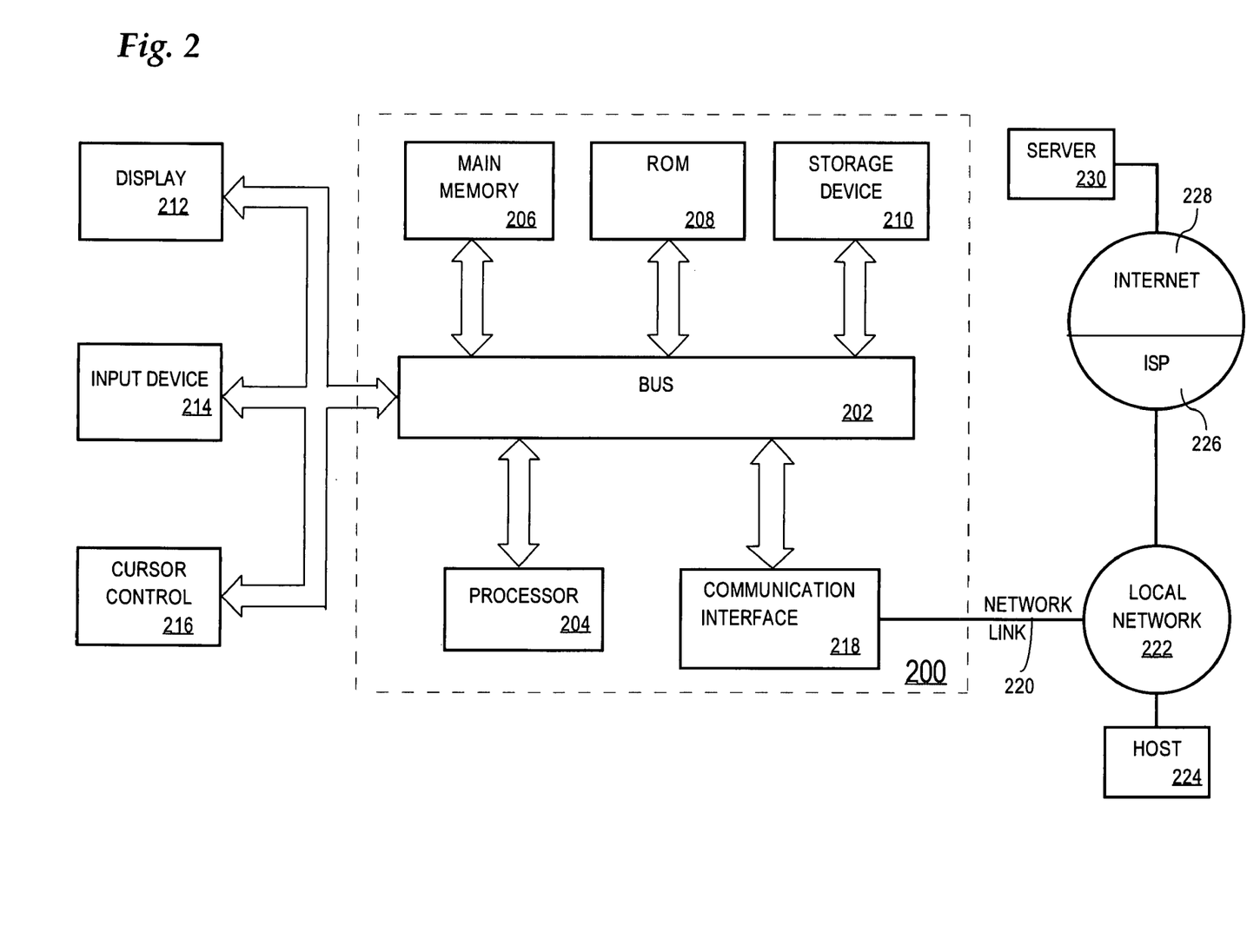
FIG. 2 is a block diagram that illustrates a computer system upon which an embodiment may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing queries comprising the computer-implemented steps of:
   receiving a query that specifies a target set of data, wherein the query includes a count operator that is to be performed over a first set of values;
   wherein the count operator specifies a first expression which, when evaluated over the target set of data, would generate the first set of values;
   generating a first representation of the query, wherein the first representation indicates that the count operator is to be performed based on the first expression;
   determining a second expression based at least on the first expression, wherein the second expression is such that the first expression would evaluate to any NOT NULL value if and only if the second expression would evaluate to any NOT NULL value;
   wherein determining the second expression includes:
      determining that whether the first expression evaluates to NULL or NOT NULL values depends on one or more sub-expressions that are included in the first expression specified in the count operator; and
      analyzing the one or more sub-expressions to determine the second expression;
   based on the first representation, generating a second representation of the query which indicates that the count operator is to be performed based on the second expression;
   wherein the steps of the method are performed by one or more computer systems.

2. The method of claim 1, wherein the second expression is a minimal expression that is NULLness equivalent to the first expression.

3. The method of claim 1, further comprising the step of executing the query based on the second representation.

4. The method of claim 3, wherein:
   the first representation and the second representation are expression trees of the query that are generated during the compilation of the query; and
   the step of executing the query further comprises executing the query based on an execution tree that is generated based on the second representation.

5. The method of claim 1, wherein the target set of data is any one of:
   a set of rows from one or more relational tables or views;
   a set of objects from one or more object tables or views; and
   a set of instances of XML data that are stored in tables or views in one of object-relational storage and Large Object (LOB) storage.

6. The method of claim 1, wherein the query is any one of a Structured Query Language (SQL) query, an XML Query Language (XQuery) query, and a SQL/XML query.

7. The method of claim 1, wherein the step of determining the second expression comprises:
   analyzing the first expression by executing a function that includes the first expression as an input argument, wherein executing the function returns a status; and
   determining the second expression based on the status returned from the function.

8. The method of claim 7, wherein the step of analyzing the first expression further comprises:
   recursively calling the function, wherein at least one recursive call to the function uses as the input argument a particular expression that was returned as an output argument from a previous call to the function.

9. The method of claim 7, wherein:
the step of analyzing the first expression includes determining that the status returned from the function indicates that the first expression, when evaluated over the target set of data, would generate only NULL values in the first set of values; and
the step of determining the second expression based on the status includes establishing the second expression as a constant NULL value.

10. The method of claim 7, wherein:
the step of analyzing the first expression includes determining that the status returned from the function indicates that the first expression, when evaluated over the target set of data, would generate only NOT NULL values in the first set of values; and
the step of determining the second expression based on the status includes establishing the second expression as a constant NOT NULL value.

11. The method of claim 10, wherein:
the step of analyzing the first expression includes determining that the first expression is to be evaluated over a column of a table, wherein the column is declared as not nullable and can store only NOT NULL values.

12. The method of claim 10, wherein:
the step of analyzing the first expression includes determining that the first expression is an XMLElement operator with "EMPTY ON NULL" option that always evaluates to an XML element.

13. The method of claim 7, wherein:
the step of analyzing the first expression includes:
determining that the status returned from the function indicates that the first expression, when evaluated over the target set of data, would generate both NULL values and NOT NULL values in the first set of values depending on a sub-expression of the one or more sub-expressions that are included in the first expression;
wherein executing the function also returns the sub-expression as an output expression from the function; and
the step of determining the second expression based on the status includes establishing the second expression as the output expression.

14. The method of claim 13, wherein:
the step of analyzing the first expression further includes determining that the first expression is to be evaluated over a column of a table, wherein the column is declared as nullable;
wherein the sub-expression, which is returned from the function as the output expression, is established as the column.

15. The method of claim 13, wherein:
the step of analyzing the first expression further includes determining that the first expression is a user-defined function specifying a particular argument, wherein the user-defined function would evaluate to any NOT NULL value if and only if the particular argument would evaluate to any NOT NULL value;
wherein the sub-expression, which is returned from the function as the output expression, is established as the particular argument.

16. The method of claim 7, wherein:
the step of analyzing the first expression includes determining that the status returned from the function indicates that the second expression cannot be determined; and
the step of determining the second expression based on the status includes establishing the second expression as the first expression.

17. The method of claim 1, wherein the first expression is a SQL/XML operator that specifies a set of arguments, and wherein the step of determining the second expression comprises:
analyzing the SQL/XML operator by recursively calling a function with each of the set of arguments as an input argument, wherein recursively calling the function returns a set of statuses that corresponds to the set of arguments; and
determining the second expression based at least on the set of statuses.

18. The method of claim 17, wherein the SQL/XML operator is any one of an XMLConcat operator, an XMLForest operator with "NULL ON NULL" option, and an XMLElement operator with "NULL ON NULL" option.

19. A method for processing queries comprising the computer-implemented steps of:
generating a first representation of a count( )query, wherein the count( )query includes a count operator to be performed based on a set of instances of XML data;
wherein the count operator specifies an XPath expression which indicates the location of the set of instances of XML data in one or more target XML documents; and
rewriting the first representation into a second representation that corresponds to an equivalent query of the count( )query, wherein the second representation indicates that the count operator is to be performed based on a set of rows stored in one or more relational tables, and wherein the second representation includes at least one operator which, when evaluated, identifies the set of rows in the one or more relational tables;
wherein rewriting the first representation into the second representation includes:
analyzing the XPath expression to determine at least one predicate that includes said at least one operator; and
including said at least one predicate into the second representation;
wherein the steps of the method are performed by one or more computer systems.

20. The method of claim 19, further comprising the step of executing the count( ) query based on the second representation.

21. The method of claim 19, wherein:
the one or more relational tables store the target XML documents as object-relational storage; and
in the second representation, said at least one operator is included in said at least one predicate for filtering the one or more relational tables to obtain the set of rows.

22. The method of claim 19, wherein:
the target XML documents are stored as any one of object relational storage and Large Object (LOB) storage;
the one or more relational tables store an XPath index over the target XML documents; and
in the second representation, said at least one operator is included in said at least one predicate for filtering the one or more relational tables to obtain the set of rows.

23. A method for processing queries comprising the computer-implemented steps of:

generating a first representation of a query, wherein the query includes a first expression for determining whether each of a set of values evaluates to any one of a NULL value and a NOT NULL value;

determining a second expression based at least on the first expression, wherein the second expression is such that the first expression would evaluate to any NOT NULL value if and only if the second expression would evaluate to any NOT NULL value;

wherein determining the second expression includes:
  determining that whether the first expression evaluates to NULL or NOT NULL values depends on one or more sub-expressions that are included in the first expression; and
  analyzing the one or more sub-expressions to determine the second expression;

based on the first representation, generating a second representation of the query which indicates that the query is to be performed based on the second expression;

wherein the steps of the method are performed by one or more computer systems.

24. The method of claim 23, wherein the second expression is a minimal expression that is NULLness equivalent to the first expression.

25. The method of claim 23, further comprising the step of executing the query based on the second representation.

26. The method of claim 25, wherein:
the first representation and the second representation are expression trees of the query that are generated during the compilation of the query; and
the step of executing the query further comprises executing the query based on an execution tree that is generated based on the second representation.

27. The method of claim 23, wherein the first expression includes any one of an IS NULL operator and an IS NOT NULL operator.

28. The method of claim 23, wherein:
the query is any one of a Structured Query Language (SQL) query, an XML Query Language (XQuery) query, and a SQL/XML query; and
the first expression is included in a specific portion of the query, wherein the specific portion is any one of:
  a predicate specified in any clause of the query;
  an item specified in a SELECT clause of the query; and
  a functional constraint specified in any clause of the query.

29. The method of claim 23, wherein the step of determining the second expression comprises:
analyzing the first expression by executing a function that includes the first expression as an input argument, wherein executing the function returns a status; and
determining the second expression based on the status returned from the function.

30. The method of claim 29, wherein the step of analyzing the first expression further comprises:
recursively calling the function, wherein at least one recursive call to the function uses as the input argument a particular expression that was returned as an output argument from a previous call to the function.

31. A machine-readable volatile or non-volatile medium storing one or more sequences of instructions that comprise instructions which, when executed by one or more processors, cause the one or more processors to perform:
receiving a query that specifies a target set of data, wherein the query includes a count operator that is to be performed over a first set of values;
wherein the count operator specifies a first expression which, when evaluated over the target set of data, would generate the first set of values;

generating a first representation of the query, wherein the first representation indicates that the count operator is to be performed based on the first expression;

determining a second expression based at least on the first expression, wherein the second expression is such that the first expression would evaluate to any NOT NULL value if and only if the second expression would evaluate to any NOT NULL value;

wherein determining the second expression includes:
  determining that whether the first expression evaluates to NULL or NOT NULL values depends on one or more sub-expressions that are included in the first expression specified in the count operator; and
  analyzing the one or more sub-expressions to determine the second expression;

based on the first representation, generating a second representation of the query which indicates that the count operator is to be performed based on the second expression.

32. The machine-readable volatile or non-volatile medium of claim 31, wherein the second expression is a minimal expression that is NULLness equivalent to the first expression.

33. The machine-readable volatile or non-volatile medium of claim 31, wherein the one or more sequences of instructions further comprise instructions which, when executed by the one or more processors, cause the one or more processors to perform executing the query based on the second representation.

34. The machine-readable volatile or non-volatile medium of claim 33, wherein:
the first representation and the second representation are expression trees of the query that are generated during the compilation of the query; and
the instructions that cause executing the query further comprise instructions which, when executed by the one or more processors, cause the one or more processors to perform executing the query based on an execution tree that is generated based on the second representation.

35. The machine-readable volatile or non-volatile medium of claim 31, wherein the target set of data is any one of:
a set of rows from one or more relational tables or views;
a set of objects from one or more object tables or views; and
a set of instances of XML data that are stored in tables or views in one of object-relational storage and Large Object (LOB) storage.

36. The machine-readable volatile or non-volatile medium of claim 31, wherein the query is any one of a Structured Query Language (SQL) query, an XML Query Language (XQuery) query, and a SQL/XML query.

37. The machine-readable volatile or non-volatile medium of claim 31, wherein the instructions that cause determining the second expression comprise instructions which, when executed by the one or more processors, cause the one or more processors to perform:
analyzing the first expression by executing a function that includes the first expression as an input argument, wherein executing the function returns a status; and
determining the second expression based on the status returned from the function.

38. The machine-readable volatile or non-volatile medium of claim 37, wherein the instructions that cause analyzing the first expression further comprise instructions which, when executed by the one or more processors, cause the one or more processors to perform:

recursively calling the function, wherein at least one recursive call to the function uses as the input argument a particular expression that was returned as an output argument from a previous call to the function.

39. The machine-readable volatile or non-volatile medium of claim 37, wherein:

the instructions that cause analyzing the first expression include instructions which, when executed by the one or more processors, cause the one or more processors to perform determining that the status returned from the function indicates that the first expression, when evaluated over the target set of data, would generate only NULL values in the first set of values; and the instructions that cause determining the second expression based on the status include instructions which, when executed by the one or more processors, cause the one or more processors to perform establishing the second expression as a constant NULL value.

40. The machine-readable volatile or non-volatile medium of claim 37, wherein:

the instructions that cause analyzing the first expression include instructions which, when executed by the one or more processors, cause the one or more processors to perform determining that the status returned from the function indicates that the first expression, when evaluated over the target set of data, would generate only NOT NULL values in the first set of values; and the instructions that cause determining the second expression based on the status include instructions which, when executed by the one or more processors, cause the one or more processors to perform establishing the second expression as a constant NOT NULL value.

41. The machine-readable volatile or non-volatile medium of claim 40, wherein:

the instructions that cause analyzing the first expression include instructions which, when executed by the one or more processors, cause the one or more processors to perform determining that the first expression is to be evaluated over a column of a table, wherein the column is declared as not nullable and can store only NOT NULL values.

42. The machine-readable volatile or non-volatile medium of claim 40, wherein:

the instructions that cause analyzing the first expression include instructions which, when executed by the one or more processors, cause the one or more processors to perform determining that the first expression is an XMLElement operator with "EMPTY ON NULL" option that always evaluates to an XML element.

43. The machine-readable volatile or non-volatile medium of claim 37, wherein:

the instructions that cause analyzing the first expression include instructions which, when executed by the one or more processors, cause the one or more processors to perform:

determining that the status returned from the function indicates that the first expression, when evaluated over the target set of data, would generate both NULL values and NOT NULL values in the first set of values depending on a sub-expression of the one or more sub-expressions that are included in the first expression;

wherein executing the function also returns the sub-expression as an output expression from the function; and the instructions that cause determining the second expression based on the status include instructions which, when executed by the one or more processors, cause the one or more processors to perform establishing the second expression as the output expression.

44. The machine-readable volatile or non-volatile medium of claim 43, wherein:

the instructions that cause analyzing the first expression further include instructions which, when executed by the one or more processors, cause the one or more processors to perform determining that the first expression is to be evaluated over a column of a table, wherein the column is declared as nullable;

wherein the sub-expression, which is returned from the function as the output expression, is established as the column.

45. The machine-readable volatile or non-volatile medium of claim 43, wherein:

the instructions that cause analyzing the first expression further include instructions which, when executed by the one or more processors, cause the one or more processors to perform determining that the first expression is a user-defined function specifying a particular argument, wherein the user-defined function would evaluate to any NOT NULL value if and only if the particular argument would evaluate to any NOT NULL value;

wherein the sub-expression, which is returned from the function as the output expression, is established as the particular argument.

46. The machine-readable volatile or non-volatile medium of claim 37, wherein:

the instructions that cause analyzing the first expression include instructions which, when executed by the one or more processors, cause the one or more processors to perform determining that the status returned from the function indicates that the second expression cannot be determined; and the instructions that cause determining the second expression based on the status include instructions which, when executed by the one or more processors, cause the one or more processors to perform establishing the second expression as the first expression.

47. The machine-readable volatile or non-volatile medium of claim 31, wherein the first expression is a SQL/XML operator that specifies a set of arguments, and wherein the instructions that cause determining the second expression comprise instructions which, when executed by the one or more processors, cause the one or more processors to perform:

analyzing the SQL/XML operator by recursively calling a function with each of the set of arguments as an input argument, wherein recursively calling the function returns a set of statuses that corresponds to the set of arguments; and determining the second expression based at least on the set of statuses.

48. The machine-readable volatile or non-volatile medium of claim 47, wherein the SQL/XML operator is any one of an XMLConcat operator, an XMLForest operator with "NULL ON NULL" option, and an XMLElement operator with "NULL ON NULL" option.

49. A machine-readable volatile or non-volatile medium storing one or more sequences of instructions that comprise instructions which, when executed by one or more processors, cause the one or more processors to perform:
   generating a first representation of a count( )query, wherein the count( )query includes a count operator to be performed based on a set of instances of XML data;
   wherein the count operator specifies an XPath expression which indicates the location of the set of instances of XML data in one or more target XML documents; and
   rewriting the first representation into a second representation that corresponds to an equivalent query of the count( )query, wherein the second representation indicates that the count operator is to be performed based on a set of rows stored in one or more relational tables, and wherein the second representation includes at least one operator which, when evaluated, identifies the set of rows in the one or more relational tables;
   wherein rewriting the first representation into the second representation includes:
      analyzing the XPath expression to determine at least one predicate that includes said at least one operator; and
      including said at least one predicate into the second representation.

50. The machine-readable volatile or non-volatile medium of claim 49, wherein the one or more sequences of instructions further comprise instructions which, when executed by the one or more processors, cause the one or more processors to perform executing the count( )query based on the second representation.

51. The machine-readable volatile or non-volatile medium of claim 49, wherein:
   the one or more relational tables store the target XML documents as object-relational storage; and
   in the second representation, said at least one operator is included in said at least one predicate for filtering the one or more relational tables to obtain the set of rows.

52. The machine-readable volatile or non-volatile medium of claim 49, wherein:
   the target XML documents are stored as any one of object relational storage and Large Object (LOB) storage;
   the one or more relational tables store an XPath index over the target XML documents; and
   in the second representation, said at least one operator is included in said at least one predicate for filtering the one or more relational tables to obtain the set of rows.

53. A machine-readable volatile or non-volatile medium storing one or more sequences of instructions that comprise instructions which, when executed by one or more processors, cause the one or more processors to perform:
   generating a first representation of a query, wherein the query includes a first expression for determining whether each of a set of values evaluates to any one of a NULL value and a NOT NULL value;
   determining a second expression based at least on the first expression, wherein the second expression is such that the first expression would evaluate to any NOT NULL value if and only if the second expression would evaluate to any NOT NULL value;
   wherein determining the second expression includes:
      determining that whether the first expression evaluates to NULL or NOT NULL values depends on one or more sub-expressions that are included in the first expression; and
      analyzing the one or more sub-expressions to determine the second expression;
   based on the first representation, generating a second representation of the query which indicates that the query is to be performed based on the second expression.

54. The machine-readable volatile or non-volatile medium of claim 53, wherein the second expression is a minimal expression that is NULLness equivalent to the first expression.

55. The machine-readable volatile or non-volatile medium of claim 53, wherein the one or more sequences of instructions further comprise instructions which, when executed by the one or more processors, cause the one or more processors to perform executing the query based on the second representation.

56. The machine-readable volatile or non-volatile medium of claim 55, wherein:
   the first representation and the second representation are expression trees of the query that are generated during the compilation of the query; and
   the instructions that cause executing the query further comprise instructions which, when executed by the one or more processors, cause the one or more processors to perform executing the query based on an execution tree that is generated based on the second representation.

57. The machine-readable volatile or non-volatile medium of claim 53, wherein the first expression includes any one of an IS NULL operator and an IS NOT NULL operator.

58. The machine-readable volatile or non-volatile medium of claim 53, wherein:
   the query is any one of a Structured Query Language (SQL) query, an XML Query Language (XQuery) query, and a SQL/XML query; and
   the first expression is included in a specific portion of the query, wherein the specific portion is any one of:
      a predicate specified in any clause of the query;
      an item specified in a SELECT clause of the query; and
      a functional constraint specified in any clause of the query.

59. The machine-readable volatile or non-volatile medium of claim 53, wherein the instructions that cause determining the second expression comprise instructions which, when executed by the one or more processors, cause the one or more processors to perform:
   analyzing the first expression by executing a function that includes the first expression as an input argument, wherein executing the function returns a status; and
   determining the second expression based on the status returned from the function.

60. The machine-readable volatile or non-volatile medium of claim 59, wherein the instructions that cause analyzing the first expression further comprise instructions which, when executed by the one or more processors, cause the one or more processors to perform:
   recursively calling the function, wherein at least one recursive call to the function uses as the input argument a particular expression that was returned as an output argument from a previous call to the function.

* * * * *